United States Patent
Wang et al.

(10) Patent No.: US 6,625,333 B1
(45) Date of Patent: Sep. 23, 2003

(54) METHOD FOR TEMPORAL INTERPOLATION OF AN IMAGE SEQUENCE USING OBJECT-BASED IMAGE ANALYSIS

(75) Inventors: Demin Wang, Kanata (CA); André Vincent, Gatineau (CA)

(73) Assignee: Her Majesty the Queen in Right of Canada as represented by the Minister of Industry through Communications Research Centre, Ottawa (CA)

( * ) Notice: Subject to any disclaimer, the term of this patent is extended or adjusted under 35 U.S.C. 154(b) by 0 days.

(21) Appl. No.: 09/369,347

(22) Filed: Aug. 6, 1999

(51) Int. Cl.$^7$ ............................. G06K 9/32; G09G 5/00; H04N 5/14
(52) U.S. Cl. ........................ 382/300; 382/173; 345/606; 348/699
(58) Field of Search ................................. 382/236, 300, 382/173, 174; 345/606–611, 422, 582, 581; 348/459, 441, 699, 700; 358/525, 428; 375/240.16

(56) References Cited

U.S. PATENT DOCUMENTS

| | | | |
|---|---|---|---|
| 4,651,207 A | 3/1987 | Bergmann et al. ........... 358/136 |
| 4,771,331 A | 9/1988 | Bierling et al. ............. 358/136 |
| 5,057,921 A | * 10/1991 | Robert et al. ............... 348/459 |
| 5,214,751 A | 5/1993 | Robert ........................ 395/129 |
| 5,394,196 A | 2/1995 | Robert ........................ 348/699 |
| 5,508,747 A | 4/1996 | Lee ............................ 348/441 |
| 5,844,616 A | * 12/1998 | Collet et al. ................ 348/441 |
| 5,933,547 A | * 8/1999 | Dudon et al. ............... 382/300 |
| 6,031,538 A | * 2/2000 | Chupeau et al. ............ 345/419 |
| 6,137,913 A | * 10/2000 | Kwak et al. ................ 382/236 |
| 6,262,409 B1 | * 7/2001 | Avaro et al. ............. 250/208.1 |

OTHER PUBLICATIONS

"A Multiscale Gradient Algorithm For Image Segmentation Using Watersheds" Wang, Pattern Recognition, vol. 30, No. 12, pp. 2043–2052, Jan. 3, 1997.

"Motion–Compensated Interpolation for Low–Bit–Rate Video Quality Enhancement" Kuo et al. SPIE conference on Applications of Digital Image Processing XXI, San Diego, California, Jul. 1998 pp. 277–288.

"MC Frame Interpolation Applying Motion–Based Segmentation and an Accelerated Motion Model" Csillag et al., PCS, Mar. 1996, pp 547–552.

* cited by examiner

*Primary Examiner*—Bhavesh M. Mehta
*Assistant Examiner*—Kanji Patel
(74) *Attorney, Agent, or Firm*—Freedman & Associates (57) ABSTRACT

A method for temporal interpolation of an image sequence using object-based image analysis is disclosed. The method comprises the steps of image segmentation for partitioning a known image into objects, motion estimation, object-based motion field processing, determination of object depth order, detection of covered areas and newly exposed areas, adaptive interpolation using motion projection, and graceful degradation for alleviating remaining visible artifacts. The method produces interpolated images of high quality in real time for every type of image areas including fast moving objects, covered areas, and newly exposed areas.

11 Claims, 10 Drawing Sheets

METHOD FOR TEMPORAL INTERPOLATION OF AN IMAGE SEQUENCE USING OBJECT-BASED IMAGE ANALYSIS

FIELD OF THE INVENTION

This invention relates generally to a method for temporal interpolation of video signals generating one or more images at any time instances between two known images. In particular, the invention relates to a method for temporal interpolation based on object-based image analysis.

BACKGROUND OF THE INVENTION

Any kind of motion picture such as film, video or television is based on the inability of the human eye to distinguish between separate images of an image sequence if the images are presented at a rate higher than approximately 16 images per second. There are numerous standards for film, video or television having different rates of images per second called frame rate. In order to display a motion picture produced with standard A using standard B the motion picture has to be converted. For example, in order to convert a video signal from a frame rate of 50 Hz to a frame rate of 60 Hz or vice-versa temporal interpolation is needed because most time instances where images have been taken do not coincide.

Furthermore, transmission of video signals with a high frame rate is often limited by the capability of existing communication channels, for example in video conferencing and video telephony. Therefore, images are dropped at the encoder prior transmission with a low bit rate and have to be reconstructed at the decoder.

A first method for image reconstruction was to repeat a nearest available image, resulting in jerkily moving objects.

In other early temporal interpolation methods, motion of objects in an image sequence was not taken into account. A pixel value was interpolated as a linear combination of values of pixels of two known images having same spatial coordinates. These methods resulted in interpolated images of poor quality within areas that are in motion.

More recently, advanced methods are taking motion into account in order to preserve a natural impression of motion. Such methods are called "motion-compensated temporal interpolation methods". Motion-compensated methods are discussed in the following references, which are hereby incorporated by reference:

U.S. Pat. No. 4,651,207 issued Mar. 17, 1987 to Bergmann et al.;
U.S. Pat. No. 4,771,331 issued Sep. 13, 1988 to Bierling et al.;
U.S. Pat. No. 5,214,751 issued May 25, 1993 to Robert;
U.S. Pat. No. 5,394,196 issued Feb. 28, 1995 to Robert;
U.S. Pat. No. 5,508,747 issued Apr. 16, 1996 to Lee;

Peter Csillag and Lilla Böröczky, "MC Frame Interpolation Applying Motion-Based Segmentation and an Accelerated Motion Model", PCS, March 1996; and, Tien-ying Kuo and C.-C. Jay Kuo, "Motion -Compensated Interpolation for Low-Bit-Rate Video Quality Enhancement", SPIE Vol. 3460, July 1998. These methods comprise the steps of motion estimation, motion field segmentation, and adaptive interpolation. With motion estimation, each pixel is associated with a motion vector. The vector field is then segmented into four types of regions: stationary regions, moving regions, covered regions, and newly exposed regions. The segmentation is carried out by classifying the estimated motion vectors. Pixel values of an image to be interpolated are determined using an adaptive interpolator together with the region and motion information. These methods produce interpolated images of good quality only if the estimated motion vectors are consistent with the true motion of objects and if the motion of the objects is not fast.

However, these motion compensated temporal interpolation methods often produce visible artifacts in covered areas, newly exposed areas, and areas with fast motion. The artifacts are caused by pixel-based image analysis used in these methods to segment images or motion vector fields, that is, each pixel is classified according to the estimated motion vector of the pixel. The estimated motion vectors in covered and newly exposed areas are usually erroneous because these areas have no counterpart in one of the known images. Within moving objects, some estimated motion vectors may be different from the true motion vectors due to image noise, shadow, or lighting change. The erroneous motion vectors result in erroneous classification of the associated pixels leading to artifacts. It is well known in the art that segmentation based on motion vector fields cannot accurately define moving object boundaries even if the motion vector field within moving objects is well estimated.

It would be advantageous to provide a method for temporal interpolation avoiding visible artifacts. Therefore, it is an object of the invention to provide a method for temporal interpolation using two known images and relying on object-based image analysis in order to determine erroneous motion vectors.

It is a further object of the invention to provide a method that provides interpolated images of high quality for every type of image area.

It is yet another object of the invention to provide a method that provides interpolated images in real time.

SUMMARY OF THE INVENTION

In accordance with the invention there is provided, a method for generating interpolated images of high quality for every type of image area. It is an advantage of the present invention to reliably determine erroneous motion vectors due to use of object-based image analysis, which substantially reduces visible artifacts in covered areas, newly exposed areas, and fast moving areas.

In accordance with the invention there is provided, a method for generating an image from at least two known images of an image sequence comprising the steps of:

a) segmenting at least one of the at least two known images into objects, the objects having a homogeneous interior with respect to luminance and colour;

b) estimating motion from the at least one segmented known image towards another of the at least two known images and assigning a motion vector to each pixel of the at least one segmented known image generating an estimated motion field;

c) processing the estimated motion field to obtain a smooth motion field within each object; and, d) calculating pixel values of the image to be interpolated using object-based motion projection.

In accordance with one embodiment of the present invention there is provided, a method for temporal interpolating an image from two known images of an image sequence comprising the steps of:

a) segmenting one of the two known images which is closer to the image to be interpolated into objects, the objects having a homogeneous interior with respect to luminance and colour;

b) estimating motion from the segmented known image towards the other known image and assigning a motion vector to each pixel of the segmented known image generating an estimated motion field;

c) processing the estimated motion field to obtain a smooth motion field within each object;

d) determining object-depth order and detecting covered areas;

e) calculating pixel values of the image to be interpolated using object-based motion projection; and, f) alleviating remaining visible artifacts by eliminating false sharp edges through graceful degradation.

In accordance with another embodiment of the present invention there is provided, a method for temporal interpolating an image from two known images of an image sequence comprising the steps of:

a) segmenting the first and the second known image into objects, the objects having a homogeneous interior with respect to luminance and colour;

b) estimating motion from the first segmented known image towards the second segmented known image and assigning a motion vector to each pixel of the first segmented known image generating a first estimated motion field;

c) estimating motion from the second segmented known image towards the first segmented known image and assigning a motion vector to each pixel of the second segmented known image generating a second estimated motion field;

d) processing the first and second estimated motion field to obtain a smooth first and second motion field within each object;

e) determining object-depth order and detecting covered areas for the first and second motion field;

f) calculating pixel values of a first image to be interpolated based on the first motion field using object-based motion projection;

g) calculating pixel values of a second image to be interpolated second motion field using object-based motion projection;

h) alleviating remaining visible artifacts in the first interpolated image by eliminating false sharp edges through graceful degradation;

i) alleviating remaining visible artifacts in the second interpolated image by eliminating false sharp edges through graceful degradation; and, j) determining the image to be interpolated as a weighted average of the first interpolated image and the second interpolated image.

BRIEF DESCRIPTION OF THE DRAWINGS

An exemplary embodiment of the invention will now be discussed in conjunction with the attached drawings in which.

DETAILED DESCRIPTION

Figure 1:
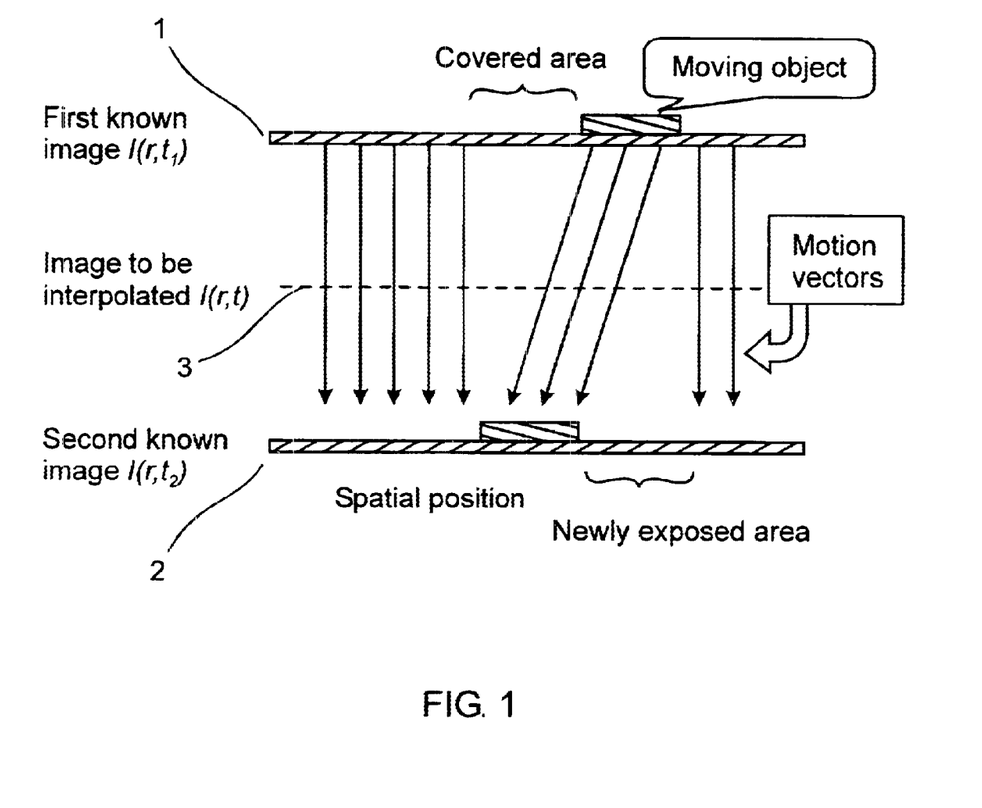
FIG. 1 illustrates schematically covered areas and newly exposed areas.

Referring to FIG. 1 two known images 1 and 2 of an image sequence are shown. For example, an image can be a field or a frame of a video signal. The known images 1 and 2 correspond to time instants $t_1$ and $t_2$ with $t_1 < t_2$, and are denoted by $I(r,t_1)$ and $I(r,t_2)$, respectively, wherein $r=[x,y]^T$ represents spatial coordinates of image pixels. From the two known images 1 and 2 an image to be interpolated $I(\rho,t)$ 3 at time instant t with $t_1 < t < t_2$ is then determined using the method according to the invention which will now be described wherein $\rho=[x,y]^T$ represents spatial coordinates of image pixels within the image to be interpolated.

Figure 2:
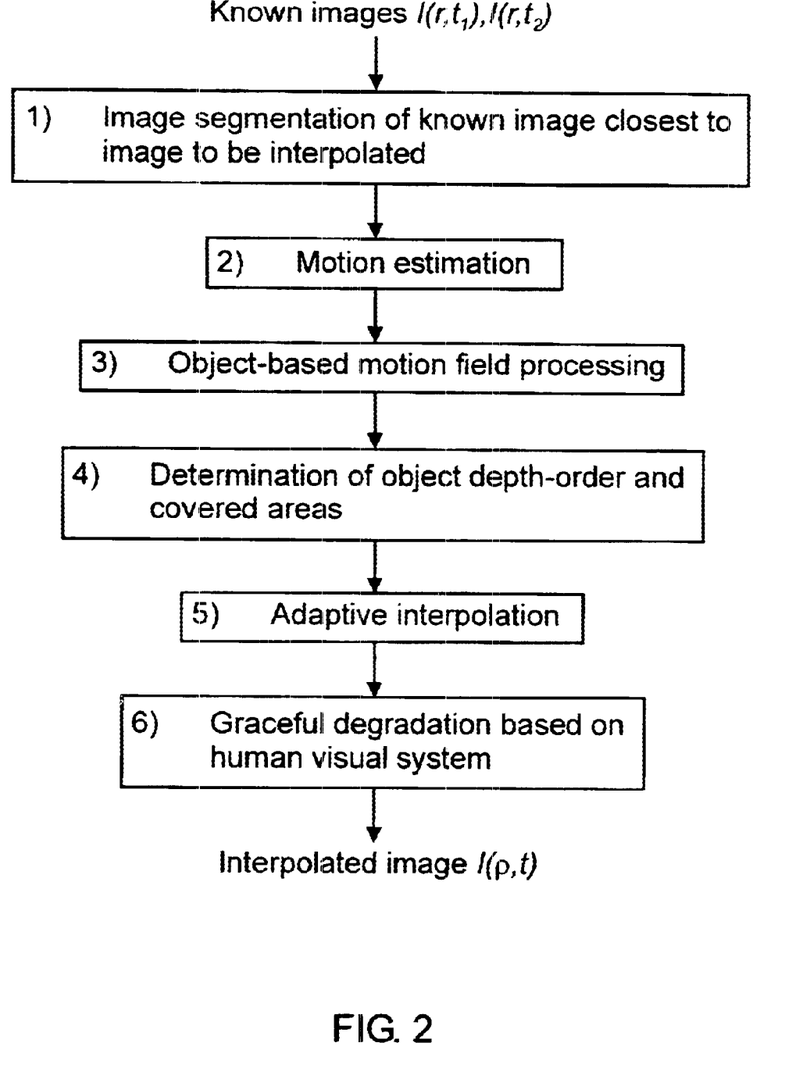
FIG. 2 is a block diagram illustrating schematically a method for temporal interpolation of an image according to the invention.

The method for temporal interpolation according to the present invention, as shown in FIG. 2, comprises the following sections:

1) image segmentation for partitioning one of the known images into objects, based on image features such as luminance, colour, and/or texture;

2) estimation of the motion from the segmented known image towards the other known image and assigning a motion vector to each pixel of the segmented known image;

3) object-based motion-field processing for detecting and correcting erroneous motion vectors and for smoothing the motion field within each object;

4) determination of depth-order, covered areas, and newly exposed areas by projecting objects in the segmented known image to the other known image;

5) adaptive interpolation for calculating each pixel value of the interpolated image using information about motion, object dept-order, covered areas, and newly exposed areas; and, 6) graceful degradation for making remaining artifacts less visible to the human eye.

Figure 3:
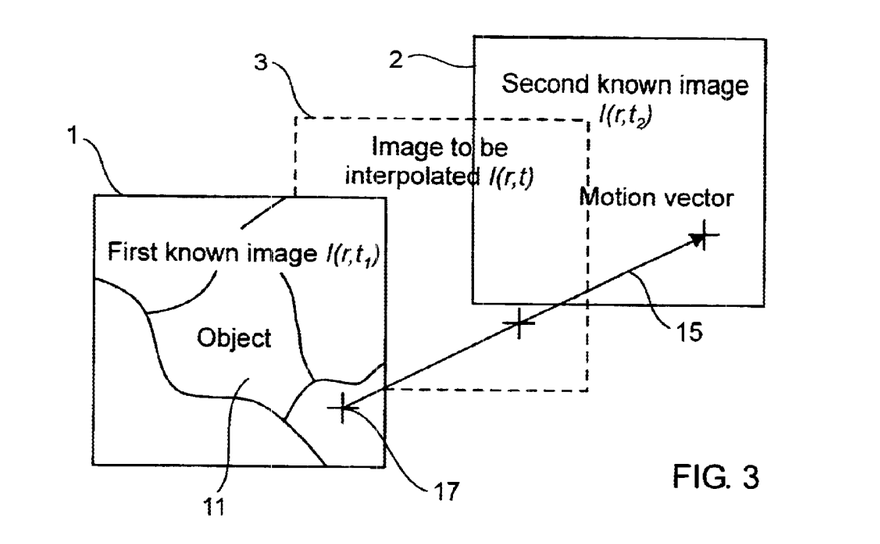
FIG. 3 illustrates schematically segmentation of a known image and an estimated motion vector using the method of temporal interpolation according to the invention.

In section 1) one of the known images 1 or 2 is segmented into objects. For the following description it is assumed that the known image 1 is segmented, as shown in FIG. 3. In the method according to the invention an object 11 is defined as an arbitrarily shaped region satisfying the following two conditions:

(1) its interior is homogenous with respect to image features such as luminance, color, and/or texture; and, (2) its contour corresponds to abrupt changes of the above features.

The method for image segmentation into objects used in the method according to the invention is disclosed in a paper by one of the inventors, D. Wang, "A multiscale gradient algorithm for image segmentation using watersheds", published in Pattern Recognition, Vol. 30, No. 12, pp. 2043–2052, 1997. Other methods for image segmentation into objects may be used if the resulting objects satisfy the above conditions.

The second step—second 2)—for interpolating image $I(\rho,t)$ 3 comprises motion estimation from image $I(r,t_1)$ 1 to image $I(r,t_2)$ 2, and to assign a motion vector 15 to each pixel 17 of image $I(r,t_1)$ 1. For the motion estimation any pixel-based, block-based, or object-based algorithm may be used. Furthermore, motion fields of previous images may also be used for better estimating the motion field at the expense of additional computing time and memory. The selection of a motion estimation algorithm has great influence on both the quality of interpolated images and the computational cost for the interpolation. In the method according to the invention a hierarchical block-matching algorithm is used. The hierarchical block-matching algorithm is fast and produces motion fields of good quality, allowing interpolation in real time applications.

Figure 4:
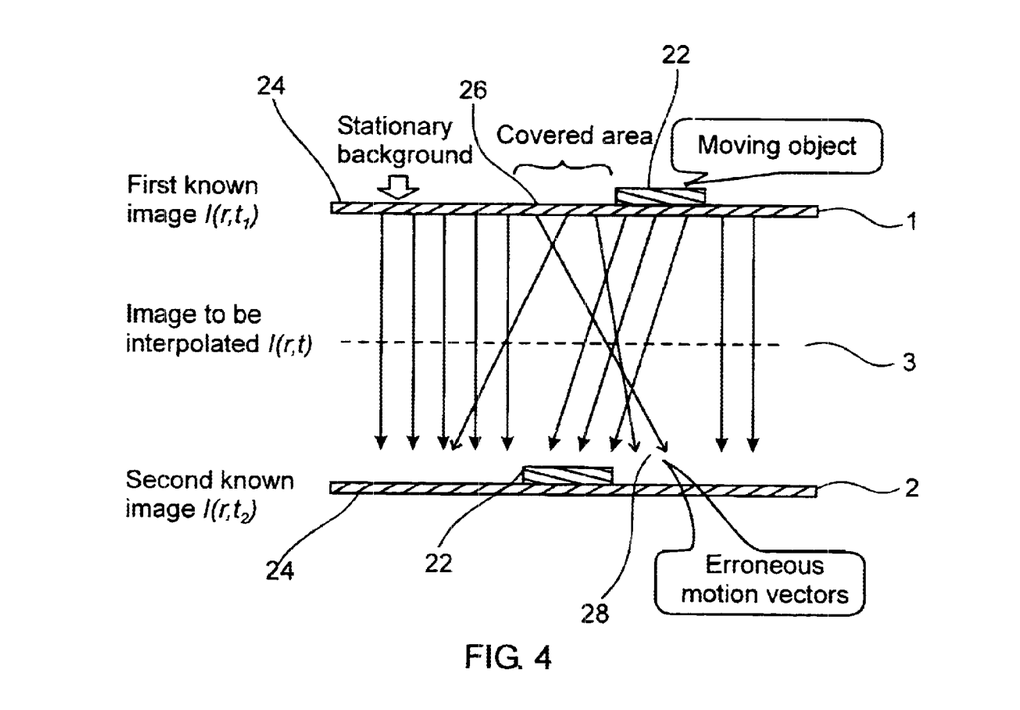
FIG. 4 illustrates schematically erroneous motion vectors estimated in a covered area.

The estimated motion field obtained in section 2) is not smooth within an object, especially when a pixel-based or block-based motion estimation algorithm has been used, due to erroneous motion vectors. An erroneous motion vector may result from occlusion of objects or newly exposed areas in successive images. For example, FIG. 4 shows two successive images wherein a rectangle 22 is moving with respect to a stationary background 24. The first image $I(r,t_1)$ 1 is segmented into two objects: the rectangle 22 and the background 24. The motion field of an area 26 left to the rectangle 22 in the first image $I(r,t_1)$ 1 cannot be correctly estimated because the rectangle 22 overlaps the corresponding area in the second image $I(r,t_2)$ 2, resulting in erroneous motion vectors 28. The erroneous motion vectors 28 are disturbing the estimated motion field causing a "noisy" motion field. A noisy motion field may result in an interpolated image of poor quality. In reality, true motion fields are smooth within each object. For example, a true motion field is zero within the stationary background 24.

According to the present invention the estimated motion field obtained in section 2) is processed in order to obtain smoothness within objects. The method for object-based motion field processing according to the invention—section 3)—comprises the following steps:

(a) The estimated motion field u(r) within an object is first approximated using a motion model resulting in an approximated motion field û(r). The motion model describes a smooth motion field within the object. In the method according to the present invention an affine motion model with 6 parameters has been used for approximating the estimated motion field. An approximation error is defined as $\|u(r)-\hat{u}(r)\|$. In general, a small number of motion vectors within the object are erroneous because of occlusion or other reasons. Hence, the approximation error is small for correctly estimated motion vectors, whereas it is large for erroneous motion vectors. An estimated motion vector is classified as an erroneous motion vector if its approximation error is greater than a threshold $T_e$. Based on test results the two components—in x and y direction— of the threshold $T_e$ are set as:

$$T_x = \begin{cases} 4e_x, & \text{if } 4e_x > 3 \\ 3, & \text{otherwise} \end{cases}$$

$$T_y = \begin{cases} 4e_y, & \text{if } 4e_y > 3 \\ 3, & \text{otherwise} \end{cases}$$

wherein $e_x$ and $e_y$ are average absolute approximation errors of the two motion vector components in x and y direction, respectively.

Figures 5, 6:
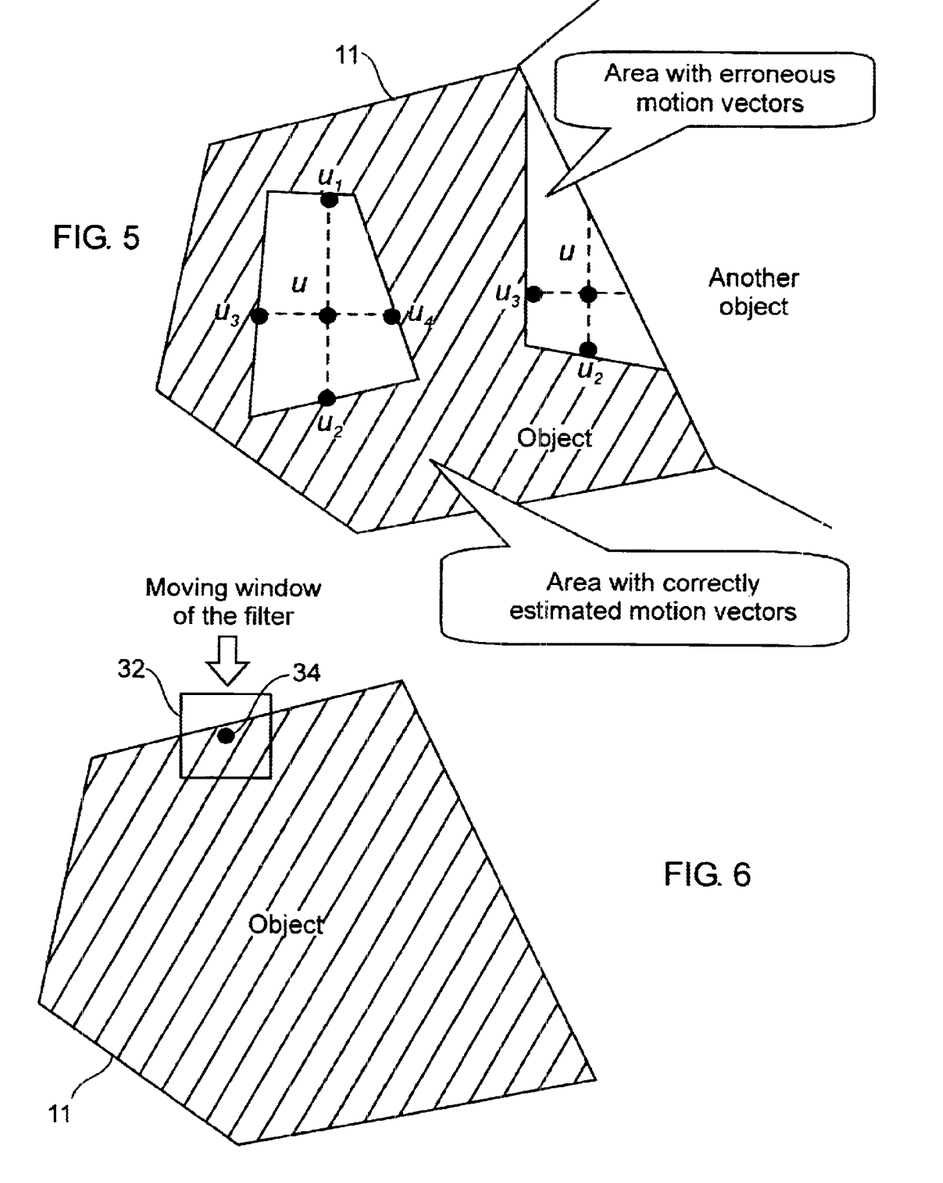
FIG. 5 illustrates schematically an object-adaptive interpolator for correcting erroneous motion vectors within an object according to the present invention.
FIG. 6 illustrates schematically application of an object-adaptive filter for smoothing the motion field within an object according to the present invention.

(b) Erroneous motion vectors are replaced using an object-adaptive interpolator. The object-adaptive interpolator uses correctly estimated motion vectors belonging only to an object 11 under consideration, as shown in FIG. 5. The interpolator performs a linear interpolation $w_1$ in y-direction using two correctly estimated motion vectors $u_1$ and $u_2$ which are closest to the erroneous motion vector u. Then another interpolation $w_2$ is performed in x-direction using two correctly estimated motion vectors $u_3$ and $u_4$ closest to the vector u. Finally, the erroneous motion vector u is replaced by a weighted average of the linear interpolations $w_1$ and $w_2$. With $d_k$ denoting a distance between u and $u_k$ for $0<k\leq4$, the object adaptive interpolator is expressed as follows in equations (1a)–(1c):

$$w_1 = \frac{d_2}{d_1+d_2}u_1 + \frac{d_1}{d_1+d_2}u_2 \tag{1a}$$

$$w_2 = \frac{d_4}{d_3+d_4}u_3 + \frac{d_3}{d_3+d_4}u_4 \tag{1b}$$

$$u = \frac{d_3+d_4}{(d_1+d_2)+(d_3+d_4)}w_1 + \frac{d_1+d_2}{(d_1+d_2)+(d_3+d_4)}w_2. \tag{1c}$$

If, for example, only one of the correct motion vectors $u_1$ and $u_2$ is available because the erroneous motion vector is adjacent to another object $w_1$ is equal to the available motion vector as is obvious from FIG. 5 and equation (1a). If none of the vectors $u_1$ and $u_2$ is available u is equal to $w_2$. In case no correctly estimated motion vectors are available u is left undefined and will be determined after further processing.

After each erroneous motion vector for which at least one of $u_1,u_2,u_3$ or $u_4$ is available has been interpolated, erroneous motion vectors for which none of $u_1,u_2,u_3$ or $u_4$ is available are interpolated using previously interpolated motion vectors.

(c) The motion field within an object is then further smoothened using an object-adaptive filter. The filter uses a window 32, which is moved to every pixel of an object 11 such that its center coincides with the pixel 34, as shown in FIG. 6. At each pixel position the filter is used to calculate an average value of the motion vectors within the window 32 and belonging to the object 11. The average value is then assigned to the central pixel 34 as the final motion vector. The window size of the object-based filter is determined based on the image size. With D being the greater of image width or image height appropriate window sizes have been found from test results using the method according to the invention as follows:

11×11 pixels, for D<356 pixels;
15×15 pixels, for 356≦D<1024 pixels;
19×19 pixels, for D≧1024 pixels.

Object-based motion field processing according to the present invention is highly advantageous by providing a method for correcting erroneous motion field vectors. The method takes advantage of the object-based segmentation of images which allows processing of the motion vectors within each object of an image and correction of erroneous motion vectors. Prior art methods such as motion-compensated temporal interpolation methods are not capable of correcting erroneous motion vectors because these methods use estimated motion vectors to segment images. Erroneously estimated motion vectors result in incorrect segmentation, and the incorrect segmentation cannot be used to correct erroneously estimated motion vectors. Another advantage of the object-based temporal interpolation of images according to the invention will become evident in the determination of object depth-order within interpolated images. The depth-order of an object refers to a distance between the object in a real scene and a camera capturing the object. When objects are moving the depth-order of objects determines appearance and disappearance of the objects in the captured images.

Figure 7:
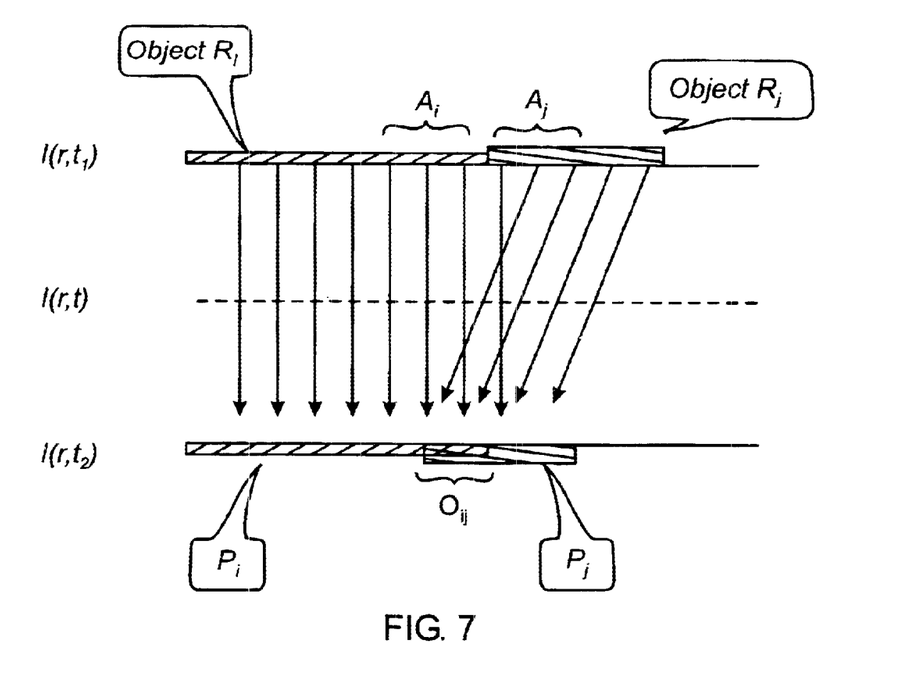
FIG. 7 illustrates schematically motion projection of objects for determining object depth-order and covered areas according to the present invention.

Referring to FIG. 7, a method for determining the depth-order according to the invention—section 4)—will now be described. Every object within a first known image $I(r,t_1)$ is projected to a second known image $I(r,t_2)$ according to its motion field. With $R_i$ and $R_j$, for i,j=0,1,2, . . . n, denoting the objects in the first image $I(r,t_1)$ and u(r) denoting the motion field after object-based motion field processing the projection of the object $R_i$ is determined as:

$$P_i = \{r+u(r)|r \in R_i\}.$$

Having determined the projection $P_i$ of the object $R_i$ a projection error for each pixel having coordinates r is then defined as $|I(r,t_1)-I(r+u(r),t_2)|$.

If $P_i$ overlaps another projection $P_j$ as shown in FIG. 7 then objects $R_i$ and $R_j$ have different depths. The overlapping area $O_{i,j}$ in the second image $I(r,t_2)$ comprises either overlapping area $A_i$ of object $R_i$ or overlapping area $A_j$ of object $R_j$. If $O_{i,j}$ comprises $A_i$ then object $R_i$ is in front of object $R_j$. In this case a projection error of area $A_i$ is smaller than a projection error of area $A_j$. Therefore, the depth-order of objects and covered areas is determined by comparing the projection errors of these areas. The total projection errors of areas $A_i$ and $A_j$ are defined as:

$$e(A_i) = \Sigma_{r \in A_i} |I(r,t_1) - I(r+u(r),t_2)|;$$

and, $$e(A_j) = \Sigma_{r \in A_j} |I(r,t_1) - I(r+u(r),t_2)|.$$

If $e(A_i) < e(A_j)$, the overlapping area $O_{i,j}$ corresponds to area $A_i$ and, therefore, object $R_i$ is in front of object $R_j$ and $A_j$ is a covered area. This information is represented by assigning a lower depth-order to object $R_i$ and a higher depth-order to object $R_j$.

Shape information of overlapping areas such as $O_{i,j}$ is stored in an image—or mask—S(r). A pixel of S(r) is equal to "1" if it belongs to a covered area, otherwise it is equal to "0". The mask S(r) will then be used in a following step of adaptive interpolation since part of a covered area may appear in an image to be interpolated.

If a large area of an object is covered in the second known image the motion field within the object is not reliable. This results from estimated motion vectors in a covered area being usually erroneous and step (a) of the object-based motion field processing being not effective in detecting a large number of erroneous motion vectors. Therefore, if the ratio of the covered area to the total area of the object is larger than a threshold, the motion field within the object is replaced by a spatial interpolation with motion fields of adjacent objects. In tests of preferred embodiments of the method according to the invention a threshold of about 0.5 has been found to provide good results. The spatial interpolation is similar to that described in step (b) of the object-based motion field processing, except that it is not object-adaptive. For each motion vector u of an object having a ratio of covered area to total area larger than the threshold, the interpolator calculates equations (1a)–(1c) using the four closest motion vectors of adjacent objects in x and y direction and replaces the motion vector u with the result.

Figure 8:
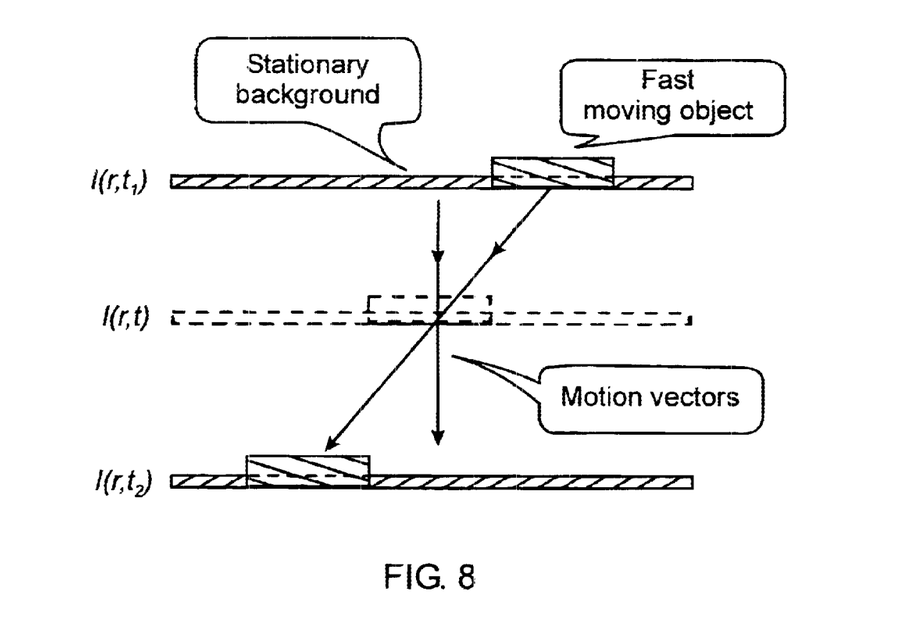
FIG. 8 illustrates schematically interpolation of an image containing a fast moving object in front of a stationary background.

The method for determining depth-order and covered areas according to the invention is highly advantageous over the prior art. If two pixels of an image $I(r,t_1)$ are projected to a same point in the image to be interpolated, prior art methods classify the pixel having a larger projection error as a covered pixel. The classification in prior art methods is based on individual motion vectors. Therefore, prior art methods are less reliable as can be seen in an example shown in FIG. 8. Two motion vectors, one originating from a fast moving object and another originating from a stationary background within a first image $I(r,t_1)$, are well estimated and projected to a same point in the image to be interpolated $I(\rho,t)$. It is possible that the motion vector originating from the fast moving object has a larger projection error than the motion vector originating from the stationary background leading to a wrong classification which results in visible artifacts disturbing the fast moving object. The method of the present invention avoids this problem by, firstly, using a projection to the second known image $I(r,t_2)$ and, secondly, comparing the total projection errors within areas instead of individual pixels.

Figure 9:
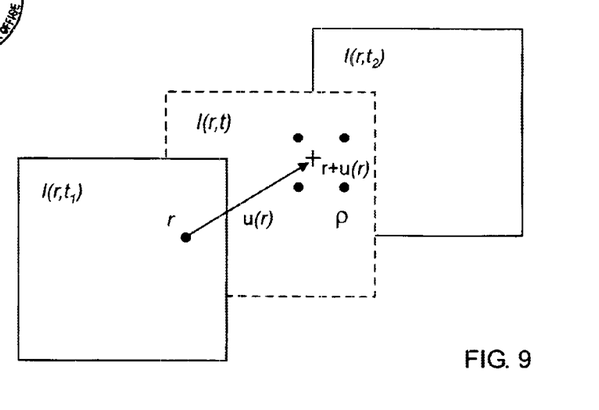
FIG. 9 illustrates schematically projection of a pixel in a known image to a point between four pixels in an image to be interpolated.

Pixel values of the image to be interpolated $I(\rho,t)$ are then calculated using adaptive motion projection—section 5). A pixel $I(r,t_1)$ within the first image $I(r,t_1)$ is projected to a point $r+\alpha u(r)$ within the image $I(\rho,t)$ to be interpolated, wherein $\alpha = (t-t_1)/(t_2-t_1)$ and u(r) is a motion vector associated with the pixel. However, point $r+\alpha u(r)$ may not correspond to a pixel position within the image $I(\rho,t)$. A straightforward solution to this problem is that a pixel closest to point $r+\alpha u(r)$ is interpolated with the motion vector u(r). A major drawback of this solution is that some pixels of the image to be interpolated $I(\rho,t)$ may be missed resulting in visible artifacts. In order to minimize the number of missed pixels, the four pixels nearest to point $r+\alpha u(r)$ are interpolated with the motion vector u(r), as shown in FIG. 9. The adaptive interpolation is then carried out as follows:

If pixel $I(\rho,t)$ has not been previously interpolated, the value of the pixel and its interpolation error $E(\rho)$ are determined by:

$$I(\rho,t)=I(\rho-\alpha u(r),t_1), \text{ if } S(r)=1 \quad (2a)$$

$$I(\rho,t)=\beta I(\rho-\alpha u(r),t_1)+\alpha I(\rho+\beta u(r),t_2), \text{ otherwise} \quad (2b)$$

with $\beta=1-\alpha$. Equation (2a) is used when an area is covered—S(r)=1–, that is the pixel value of the first image is projected to the interpolated image. Otherwise, the pixel value is interpolated according to equation (2b) using the pixel values of the first and the second image. The interpolation error is defined as:

$$E(\rho)=|I(\rho-\alpha u(r),t_1)-I(\rho+\mu u(r),t_2)|. \quad (3)$$

In addition, the depth-order of object $R_i$ is stored in an image denoted by $F(\rho)$ and the motion vector $u(r)$ is stored in a projected motion field denoted by $U(\rho)=u(r)$.

If pixel $I(\rho,t)$ has been previously interpolated by projecting other pixels, the depth-order of object $R_i$ is compared with that stored in $F(\rho)$. If the depth-order of $R_i$ is lower, the old values of $I(\rho,t)$, $E(\rho)$, $F(\rho)$ and $U(\rho)$ are replaced by the new values. If the depth order of $R_i$ is the same as $F(\rho)$, the new projection error $E(\rho)$ is compared with the old one. If the new error is smaller, the old values of $I(\rho, t)$, $E(\rho)$, $F(\rho)$ and $U(\rho)$ are replaced by the new ones. Otherwise, the old values are retained.

Newly exposed areas in the second known image $I(r,t_2)$ do not receive any pixel projection from the first known image $I(r,t_1)$, as shown in FIG. 1. Newly exposed areas may appear in the image to be interpolated $I(\rho,t)$. In order to calculate a pixel value within the newly exposed areas in the image to be interpolated $I(\rho,t)$, the projected motion field $U(\rho)$ is interpolated using the spatial interpolator described in the section of the motion field processing. The values of $I(\rho,t)$ and $E(\rho)$ in these areas are then determined as follows:

$$I(\rho,t)=I(\rho+\beta U(\rho),t_2) \quad (4)$$

$$E(\rho)=|I(\rho-\alpha U(\rho),t_1)-I(\beta+\beta U(\rho),t_2)|. \quad (5)$$

Figure 10:
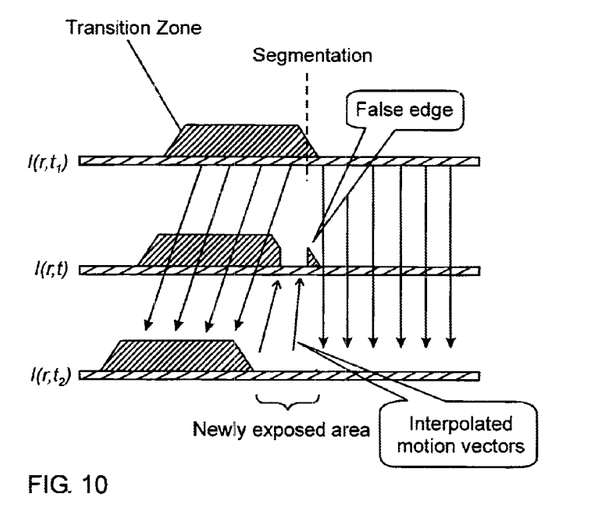
FIG. 10 illustrates schematically creation of a false edge between a newly exposed area and other interpolated areas.
Figure 11:
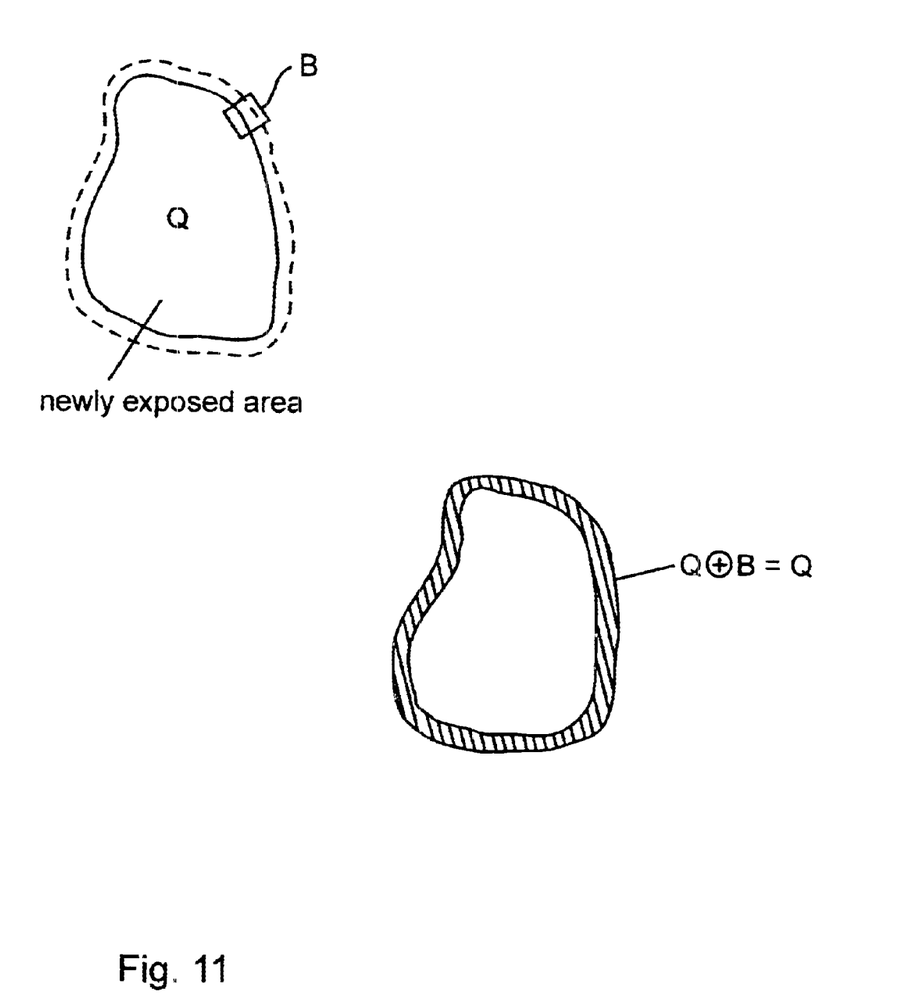
FIG. 11 illustrates schematically detection of a band surrounding a newly exposed area according to the present invention.

Transition between a newly exposed areas and other interpolated areas is not smooth even if these areas belong to a same object. This results from the fact that in natural images the transition from one object to another is not a sudden change but a transition zone between two adjacent objects. A good image segmentation method partitions objects along the middle of transition zones. The transition zones are also projected to the interpolated image $I(\rho,t)$. The projected transition zones create false edges in $I(\rho,t)$ and make the transition between newly exposed areas and other areas not smooth, as shown in FIG. 10. In a method according to the invention this problem is solved by modifying pixel values within a band surrounding every newly exposed area Q in the interpolated image $I(\rho,t)$. Referring to FIG. 11, a band around a newly exposed area Q is detected by Q⊕B−Q, wherein ⊕ denotes dilation and B a structuring element. If the interpolation error $E(\rho)$ of a pixel within the band is larger than a predetermined threshold, the value of the pixel is replaced using equation (4). Otherwise, the value remains unchanged. Tests using this method produced good results for a structuring element of 5×5 pixels and a threshold of 30. This method according to the present invention produces a substantially smooth transition between newly exposed areas and other interpolated areas.

The method for interpolating images according to the present invention produces interpolated images of high quality for most image sequences. However, there are situations where some visible artifacts may still occur such as deforming objects, lighting changes between two known images and very fast moving objects in video signals having a very low frame rate. A visible artifact is usually a small region having an incorrect colour seen as a false sharp edge surrounding an object or parts of an object. A method according to the present invention to alleviate such remaining visible artifacts—section 6)—is based on the characteristic that the human visual system is less sensitive to blur of an object than a false sharp edge of the object, especially when the object is moving fast. To that end, the method according to the present invention makes such artifacts less visible to the human eye by eliminating false sharp edges through graceful degradation. If the motion vector $U(\rho)$ of a pixel within the interpolated image $l(\rho,t)$ is greater than a predetermined threshold $T_u$ the value of the pixel is replaced by an average value within an L×L window centered on the pixel. The threshold $T_u$ and the window size are determined depending on image size. With D denoting image width or height whichever is greater, d denoting the module of the motion vector $U(\rho)$ a threshold of $T_u=D/10$ and a window size L=d/10 have been found to produce good results.

Figure 12A:
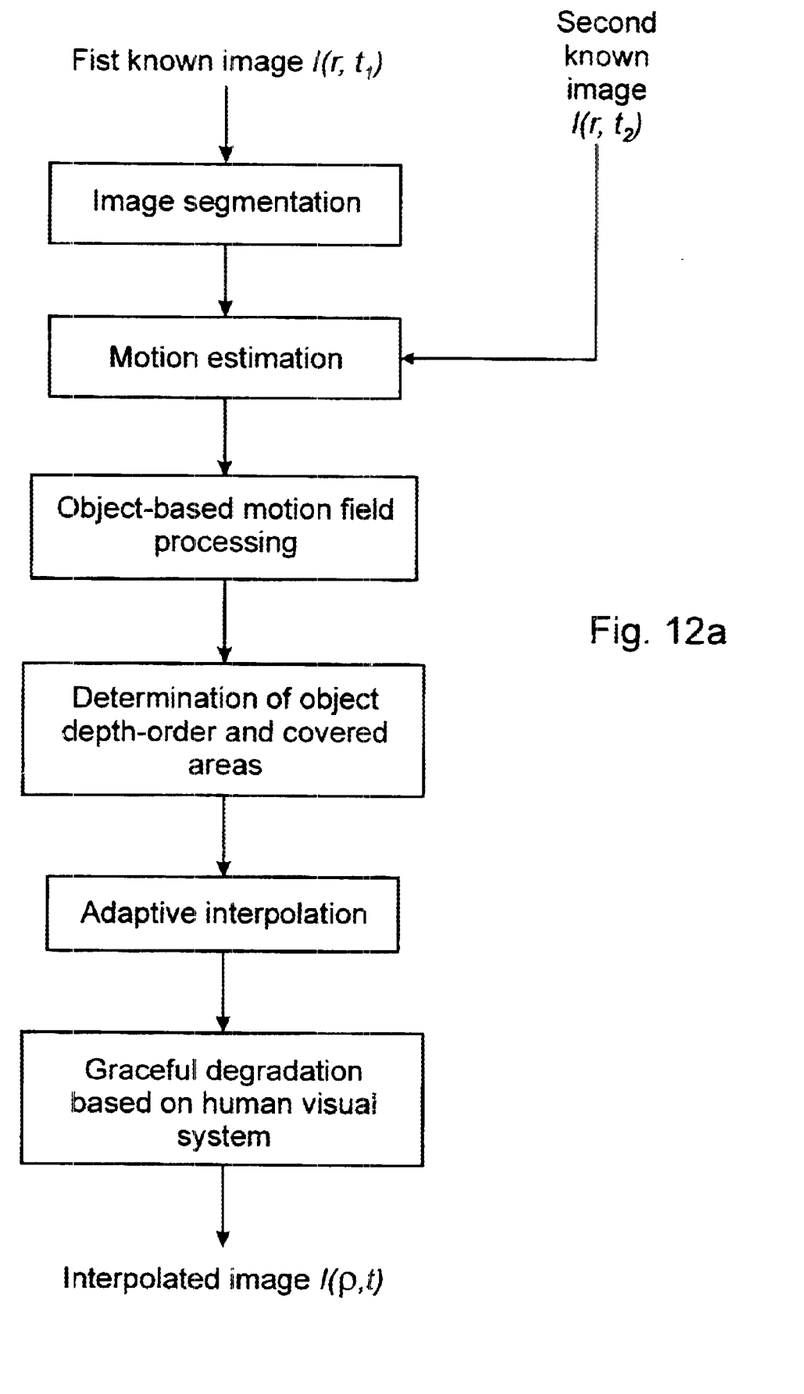
FIG. 12a is a block diagram illustrating schematically an embodiment of a method for temporal interpolation of an image according to the present invention.

Referring to FIG. 12a a flow diagram of an embodiment of the method for temporal interpolating of an image according to the invention is shown. A first known image is segmented for partitioning the image into objects. Motion from the first image towards the second image is then estimated and a motion vector is assigned to each pixel of the first image. The order of the following sections remains the same as in the outline of the method shown in FIG. 2.

Figure 12B:
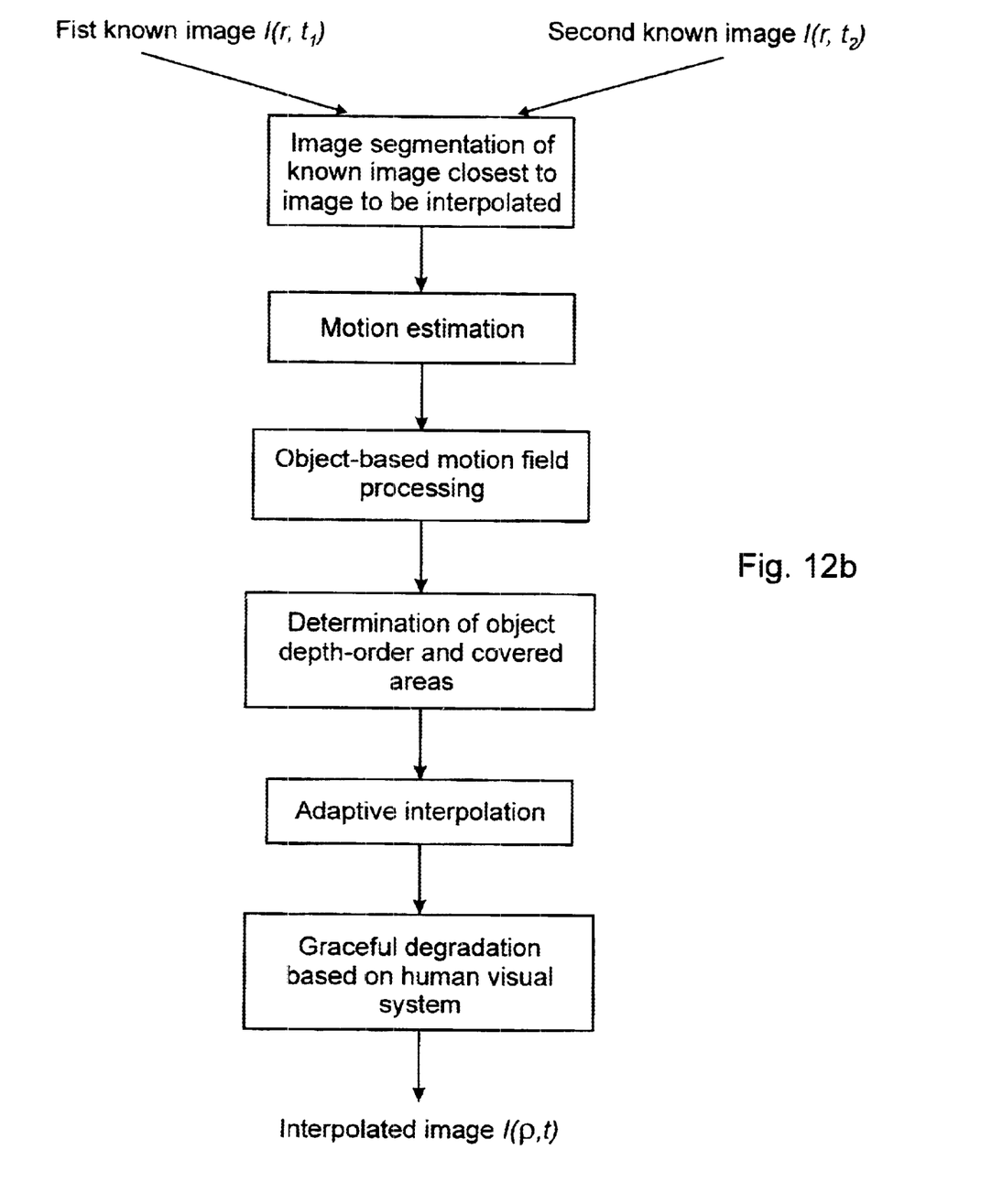
FIG. 12b is a block diagram illustrating schematically another embodiment of a method for temporal interpolation of an image according to the present invention.

Interpolated images of better quality are obtained using another embodiment of the method according to the present invention, shown in FIG. 12b. In this preferred embodiment the known image which is closer to the image to be interpolated is segmented into objects. Interpolated images are of better quality using this embodiment because the known image closer to the image to be interpolated has a higher correlation, therefore, increasing accuracy.

Figure 12C:
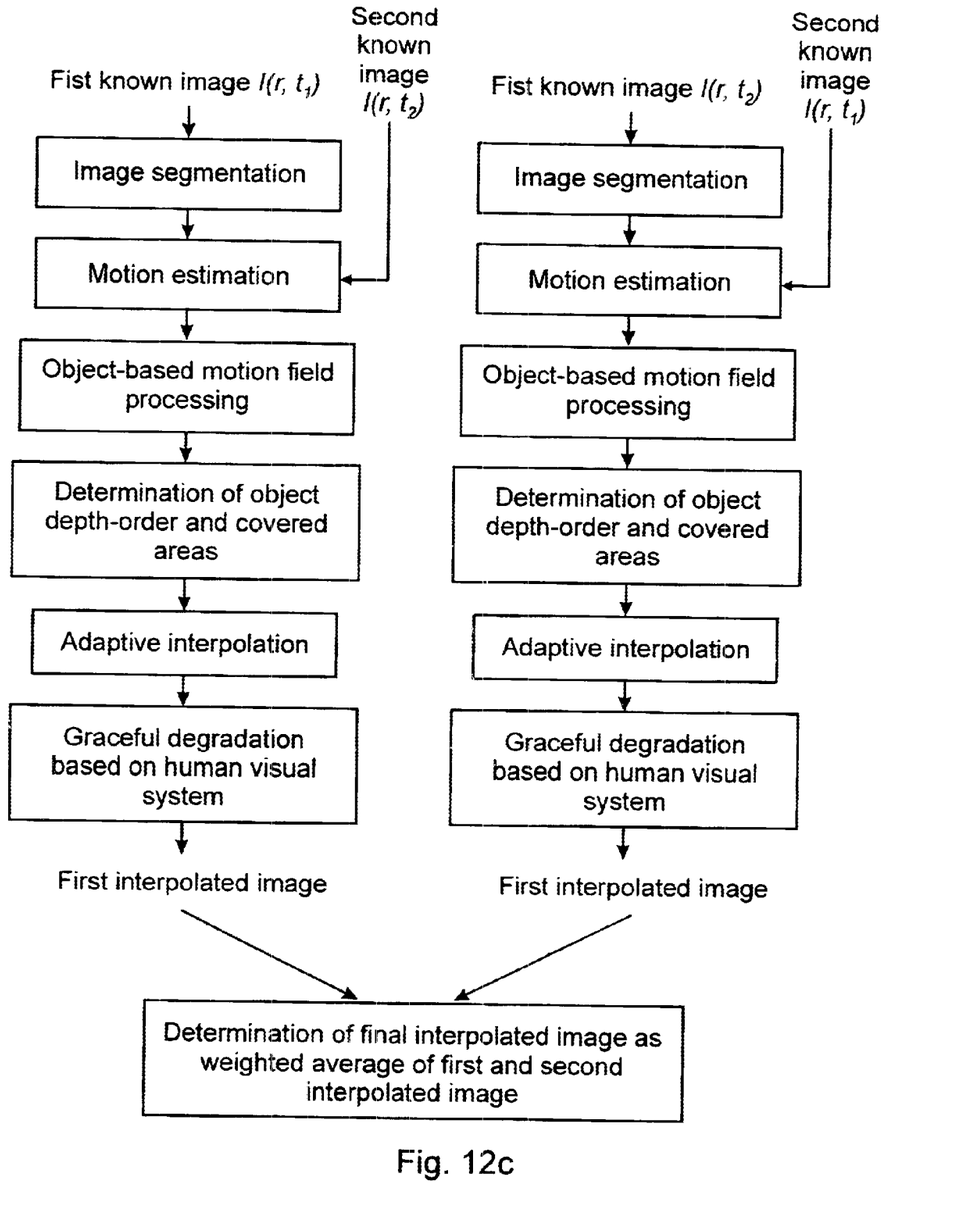
FIG. 12c is a block diagram illustrating schematically yet another embodiment of a method for temporal interpolation of an image according to the present invention.

Another preferred embodiment produces two interpolated images $I'(\rho,t)$ and $I''(\rho,t)$, as shown in FIG. 12c. Image $I'(\rho,t)$ is generated with segmentation of the first known image and motion estimation from the first known image towards the second known image, whereas $I''(\rho,t)$ is generated with segmentation of the second known image and motion estimation from the second known image towards the first known image. Remaining visible artifacts in the interpolated images $I'(\rho,t)$ and $I''(\rho,t)$ are alleviated then through graceful degradation of false sharp edges before generating the final interpolated image. The final interpolated image is a weighted average of $I'(\rho,t)$ and $I''(\rho,t)$ described as follows:

$$I(\rho,t)=A_1 I'(\rho,t)+A_2 I''(\rho,t)$$

with $$A_1 = \frac{(2+E''(\rho))(t_2-t)}{(2+E'(\rho))(t-t_1)+(2+E''(\rho))(t_2-t)}$$

$$A_2 = \frac{(2+E'(\rho))(t-t_1)}{(2+E'(\rho))(t-t_1)+(2+E''(\rho))(t_2-t)},$$

wherein $E'(\rho,t)$ and $E''(\rho,t)$ are interpolation errors of $I'(\rho,t)$ and $I''(\rho,t)$, respectively. This method usually provides interpolated images of even better quality but requires substantially more computing effort in order to obtain a final interpolated image.

Alternatively, the final interpolated image is generated without alleviating remaining visible artifacts in the interpolated images $I'(\rho,t)$ and $I''(\rho,t)$. False sharp edges in the final interpolated image are then eliminated through graceful degradation.

Furthermore, in yet another embodiment of the method for temporal interpolating of an image according to the invention more than two known images are used for motion estimation and using higher order interpolation algorithms in order to increase accuracy of images to be interpolated.

The method for temporal interpolation of an image according to the present invention produces interpolated images of high quality and allows generation of interpolated images in real time. Therefore, the method according to the present invention is highly advantageous over the prior art and, furthermore, allows to overcome bandwidth problems in applications such as video conferencing or telepresence by capturing and transmitting video signals at a lower frame rate and generating interpolated images for display in real time. Furthermore, the high accuracy of the method according to the invention makes it ideal for any kind of conversion of image sequences from one standard to another, for example, conversion between standards having a different frame rate; conversion between interlaced and non-interlaced or conversion of any image sequence to the new HDTV standard. Yet another application of the method according to the present invention is spatial interpolation of stereo images.

Of course, numerous other embodiments may be envisaged without departing from the spirit and scope of the invention.

What is claimed is:

1. A method for generating an image from at least two known images of an image sequence comprising the steps of:
   a) segmenting at least one of the at least two known images into objects, the objects having a homogeneous interior with respect to luminance, colour, and/or texture;
   b) estimating motion from the at least one segmented known image towards another of the at least two known images and assigning a motion vector to each pixel of the at least one segmented known image generating an estimated motion field;
   c) processing the estimated motion field to obtain a smooth motion field within each object;
   d) calculating pixel values of the image to be interpolated using object-based motion projection;
   e) determining object-depth order and detecting covered areas;
   f) projecting every object of the segmented known image to another known image and calculating a projection error for each pixel of the segmented known image;
   g) calculating a total projection error for each of two overlapping areas; and,
   h) comparing the total projection errors of overlapping areas and assigning a depth-order to each of the objects which contain the overlapping areas.

2. A method for generating an image from at least two known images of an image sequence as defined in claim 1, comprising the steps of:
   determining covered areas in dependence upon the depth-order; and,
   generating a mask containing shape information of the covered areas.

3. A method for generating an image from at least two known images of an image sequence as defined in claim 1, comprising the steps of:
   modifying the motion field within objects comprising a large covered area by replacing the motion vectors within the object with motion vectors interpolated from motion vectors of adjacent objects.

4. A method for generating an image from at least two known images of an image sequence as defined in claim 1, wherein step d) comprises the step of:
   calculating pixel values of the image to be interpolated as a weighted average of pixel values of the segmented known image and the at least other known image.

5. A method for generating an image from at least two known images of an image sequence as defined in claim 1, comprising the step of:
   retaining one projection in areas where projections overlap each other according to the depth-order of objects.

6. A method for generating an image from at least two known images of an image sequence as defined in claim 5, wherein the pixel values within projected areas corresponding to covered areas are equal to the pixel values of the segmented known image.

7. A method for generating an image from at least two known images of an image sequence as defined in claim 5, wherein the pixel values within projected areas corresponding to newly exposed areas are determined using only the pixel values of the other known image.

8. A method for generating an image from at least two known images of an image sequence as defined in claim 7, comprising the step of:
   determining pixel values for pixels within a band surrounding newly exposed areas using only the pixel values of the other known image if an interpolation error of pixel values of the pixels within the band obtained as a weighted average of pixel values of the segmented known image and the at least other known image is greater than a predetermined threshold.

9. A method for temporal interpolating an image from two known images of an image sequence comprising the steps of:
   a) segmenting one of the two known images which is closer to the image to be interpolated into objects, the objects having a homogeneous interior with respect to luminance and colour;
   b) estimating motion from the segmented known image towards the other known image and assigning a motion vector to each pixel of the segmented known image generating an estimated motion field;
   c) processing the estimated motion field to obtain a smooth motion field within each object comprising the steps of:
      approximating the estimated motion field within each object using an affine motion model describing a smooth motion field within each object;
      comparing the estimated motion field with the approximated motion field to determine an approximation error for each motion vector of the estimated motion field;
      classifying the motion vectors of the estimated motion field into correctly estimated motion vectors and erroneous motion vectors by comparing the approximation error of each estimated motion vector to a threshold; and,
      replacing each erroneous motion vector with a motion vector obtained by interpolating correct motion vectors closest to the erroneous motion vector using an object-adaptive interpolator, the correct motion vectors belonging to a same object as the erroneous motion vector;
   d) determining object-depth order and detecting covered areas comprising the steps of:
      projecting every object of the segmented known image to another known image and calculating a projection error for each pixel of the segmented known image;
      calculating a total projection error for each of two overlapping areas;
      comparing the total projection errors of overlapping areas and assigning a depth-order to each of the objects which contain the overlapping areas;

determining covered areas in dependence upon the depth-order; and, generating a mask containing shape information of the covered areas;

e) calculating pixel values of the image to be interpolated using object-based motion projection; and, f) alleviating remaining visible artifacts by eliminating false sharp edges by replacing the value of a pixel within the interpolated image with an average value within a window centered on the pixel if the motion vector of the pixel is greater than a threshold.

10. A method for temporal interpolating an image from two known images of an image sequence comprising the steps of:

a) segmenting the first and the second known image into objects, the objects having a homogeneous interior with respect to luminance and colour;

b) estimating motion from the first segmented known image towards the second segmented known image and assigning a motion vector to each pixel of the first segmented known image generating a first estimated motion field;

c) estimating motion from the second segmented known image towards the first segmented known image and assigning a motion vector to each pixel of the second segmented known image generating a second estimated motion field;

c) processing the first and second estimated motion field to obtain a smooth first and second motion field within each object;

d) determining object-depth order and detecting covered areas for the first and second motion field;

e) calculating pixel values of a first image to be interpolated based on the first motion field using object-based motion projection;

f) calculating pixel values of a second image to be interpolated second motion field using object-based motion projection;

g) alleviating remaining visible artifacts in the first interpolated image by eliminating false sharp edges through graceful degradation;

h) alleviating remaining visible artifacts in the second interpolated image by eliminating false sharp edges through graceful degradation; and, i) determining the image to be interpolated as a weighted average of the first interpolated image and the second interpolated image.

11. A method for temporal interpolating an image from two known images of an image sequence as defined in claim 10, wherein weighting coefficients in step i) are determined in dependence upon interpolation error and time distance between the two known images and the interpolated images.

* * * * *